United States Patent
Ranganna et al.

(10) Patent No.: US 10,769,641 B2
(45) Date of Patent: Sep. 8, 2020

(54) SERVICE REQUEST MANAGEMENT IN CLOUD COMPUTING SYSTEMS

(71) Applicant: Microsoft Technology Licensing, LLC, Redmond, WA (US)

(72) Inventors: Supreeth Ranganna, Sammamish, WA (US); Vadi Ramalingam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 514 days.

(21) Appl. No.: 15/164,715

(22) Filed: May 25, 2016

(65) Prior Publication Data

US 2017/0345015 A1    Nov. 30, 2017

(51) Int. Cl.
*G06Q 30/00* (2012.01)
*H04L 12/24* (2006.01)

(52) U.S. Cl.
CPC ......... *G06Q 30/016* (2013.01); *H04L 41/507* (2013.01); *H04L 41/5035* (2013.01); *H04L 41/5074* (2013.01); *H04L 41/5096* (2013.01)

(58) Field of Classification Search
CPC .................................................. G06Q 30/016
See application file for complete search history.

(56) References Cited

U.S. PATENT DOCUMENTS

| | | | |
|---|---|---|---|
| 7,930,681 B2 | 4/2011 | Kloeffer et al. | |
| 8,135,612 B1 | 3/2012 | Scudder | |
| 8,266,072 B2 * | 9/2012 | Grace | G06Q 10/063 705/304 |
| 9,229,800 B2 | 1/2016 | Jain et al. | |
| 2002/0073364 A1 * | 6/2002 | Katagiri | G06F 11/327 714/48 |
| 2005/0010461 A1 | 1/2005 | Manos | |
| 2011/0179017 A1 | 7/2011 | Meyers et al. | |
| 2012/0330702 A1 * | 12/2012 | Kowalski | G06F 16/248 705/7.11 |
| 2013/0091065 A1 | 4/2013 | Telehowski et al. | |
| 2013/0339515 A1 | 12/2013 | Radhakrishnan | |

(Continued)

OTHER PUBLICATIONS

"How Predictive Analytics are Improving Data Center Operations for Infrastructure, Databases, and Applications", Published on: Feb. 21, 2016 Available at: https://www-304.ibm.com/events/tools/interconnect/2016ems/REST/presentations/PDF/InterConnect2016_6673.pdf.

(Continued)

*Primary Examiner* — Dennis W Ruhl
(74) *Attorney, Agent, or Firm* — Liang IP, PLLC

(57) ABSTRACT

Techniques for managing service requests in cloud computing systems are disclosed herein. In one embodiment, a method can include in response to determining that a profile of detected service requests substantially deviates from the predetermined profile, identifying a component failure of a service component in the cloud computing system by searching a database containing operational event logs of the cloud computing system based on the detected service requests. The method can then include posting, on a user portal of the cloud computing system, a notification to additional users regarding the identified component failure of the service component and performing various remedial actions to correct the identified component failure.

19 Claims, 5 Drawing Sheets

(56) References Cited

U.S. PATENT DOCUMENTS

| | | | |
|---|---|---|---|
| 2013/0346572 A1* | 12/2013 | Jain | G06F 9/5088 709/223 |
| 2014/0053025 A1* | 2/2014 | Marvasti | G06F 11/079 714/37 |
| 2014/0129536 A1* | 5/2014 | Anand | G06Q 10/0635 707/706 |
| 2014/0250333 A1* | 9/2014 | Duggan | G06F 11/079 714/37 |
| 2014/0280197 A1* | 9/2014 | Gatto | G06F 17/30424 707/741 |
| 2014/0316845 A1* | 10/2014 | Nayak | G06Q 10/10 705/7.28 |
| 2015/0081885 A1 | 3/2015 | Thomas et al. | |
| 2015/0278823 A1* | 10/2015 | Kushnir | G06Q 30/016 705/304 |

OTHER PUBLICATIONS

Chandramouly, et al., "Reducing Client Incidents through Big Data Predictive Analytics", In IT@Intel White Paper, Dec. 2013, 10 pages.

"Service Desk", Published on: Mar. 20, 2016, Available at: http://www8.hp.com/uk/en/software-solutions/service-desk/.

"ITIL Incident Management", Retrieved on: Apr. 11, 2016, Available at: http://www.bmcsoftware.in/guides/itil-incident-management.html.

"Support Datasheet: Cisco Remote Management Services (RMS) Support for Cisco IronPort Cloud Email Security Services", Retrieved on: Apr. 11, 2016, Available at: http://www.cisco.com/c/dam/en_us/about/doing_business/legal/service_descriptions/docs/Datasheet_for_Cisco_Remote_Management_Services_RMS_for_Cloud_Email_Security_Support.pdf.

Mamudi, Valon, "Cloud Incident Management", Published on: Aug. 3, 2014, Available at: https://blog.zhaw.ch/icclab/category/research-approach/themes/cloud-incident-management/.

Cao, et al., "Incident management process for the cloud computing environments", In IEEE International Conference on Cloud Computing and Intelligence Systems, Sep. 15, 2011, pp. 225-229.

Munteanu, et al., "Cloud Incident Management. Challenges, Research Directions and Architectural Approach", In Proceedings of IEEE/ACM 7th International Conference on Utility and Cloud Computing, Dec. 8, 2014, pp. 786-791.

"Incident & maintenance ticketing module Ticket management . . . handle it effectively", Retrieved on: Feb. 13, 2016 Available at: http://www.satelliz.com/en/monitoring-software/incident-tickets-and-maintenances/.

"ServiceNow—ServiceWatch Insight", Published on: Jan. 26, 2016 Available at: https://www.servicenow.com/content/dam/servicenow/documents/datasheets/ds-ServiceWatch-insight.pdf.

Dell'Oca, Luca, "What Features do you think a Help Desk Solution Should Have?", Published on: Jul. 8, 2013 Available at: https://thwack.solarwinds.com/thread/57714

Mohan, Vinod, "5 Steps to Simplify Service Request & Ticketing Management", Published on: Nov. 27, 2013 Available at: http://www.dameware.com/cmdprompt/5-steps-to-simplify-service-request-ticketing-management.aspx.

Li, et al., "Incident Ticket Analytics for IT Application Management Services", In Proceedings of the IEEE International Conference on Services Computing, Jun. 27, 2014, pp. 568-574.

Ramakrishnan, Kumaravel, "Seven Tips for Handling a Super Bowl Spike for Your IT Help Desk", Published on: Jan. 27, 2014 Available at: https://blogs.manageengine.com/help-desk/servicedesk/2014/01/27/seven-tips-for-handling-a-super-bowl-spike-for-your-it-help-desk.html.

Wayne, "Help Desk Ticket Categories: CREATE Help Desk ticket classification", Published on: Aug. 14, 2012 Available at: http://buildahelpdesk.com/help-desk-ticket-classification/.

Schlicht, Wayne, "How to Reduce Incident Mean Time to Restore Service (MTTRS) at your company", Published on: Nov. 1, 2015 Available at: https://www.linkedin.com/pulse/how-reduce-incident-mean-time-restore-service-mttrs-your-schlicht?trk=prof-post&trkSplashRedir=true&forceNoSplash=true.

"ManageEngine Advances ServiceDesk Plus Analytics with Zoho Reports Integration", Published on: Dec. 10, 2014 Available at: https://www.manageengine.com/news/manageengine-servicedesk-plus-analytics-zoho-reports-integration.html.

Franke, et al., "An online spike detection and spike classification algorithm capable of instantaneous resolution of overlapping spikes", In Journal of computational neuroscience, vol. 29, Issue 1-2, Aug. 2010, pp. 127-148.

* cited by examiner

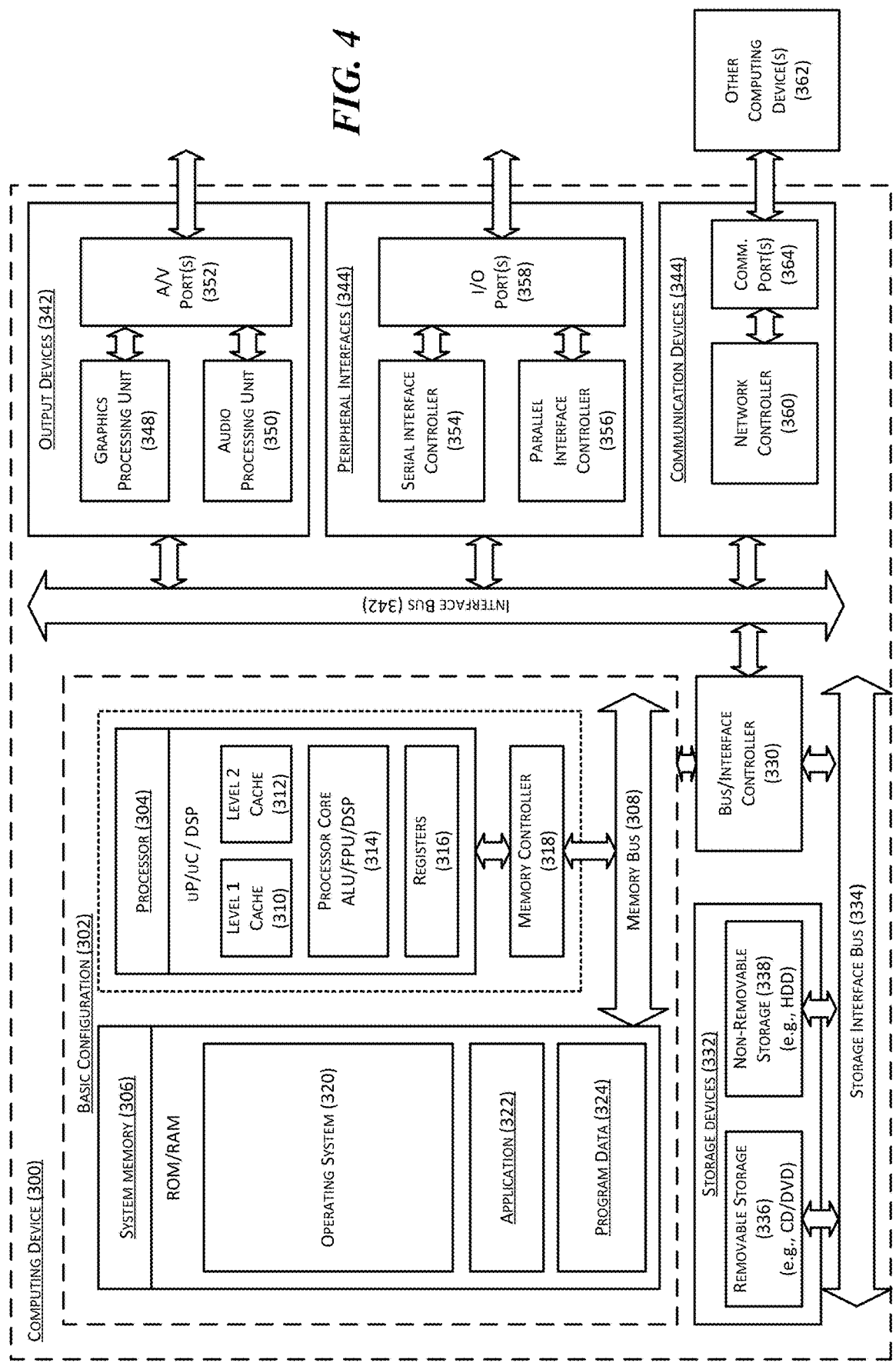

SERVICE REQUEST MANAGEMENT IN CLOUD COMPUTING SYSTEMS

BACKGROUND

Remote or "cloud" computing typically utilizes a collection of remote servers in datacenters to provide computing, cloud storage, communications, or other cloud services. A communications network can interconnect the remote servers as nodes to form one or more computing clusters in datacenters. During operation, one or more nodes in the datacenters can cooperate to provide a distributed computing environment that facilitates execution of various applications in order to provide various cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Hardware, software, or other types of issues in datacenters can often cause service issues in which cloud services are disrupted. When such service issues occur, users may experience service outages or low performance levels that trigger the users to submit service requests to cloud service providers. In certain computing systems, such service requests can amount to about 4% to about 7% of the total service requests to the cloud service providers. In addition, the service issues can negatively affect users' perception of service availability and/or quality.

Certain computing systems can have long delays between receiving initial service requests and communicating the service issues to all affected users. The long delays are due, at least in part, to long periods needed to often manually identify and understand the service issues from the received service request. The long delays can negatively affect perception of service quality of the cloud services as well as triggering additional submissions of service requests concerning the same service issues.

Several embodiments of the disclosed technology can shorten the delays between receiving service requests and communicating service issues to impacted users. In certain embodiments, a service request server can detect and consolidate received service requests from a group of users. The service request server can then identify profile abnormalities in the received service requests by for examples, comparing an average number of service requests per hour with a predetermined threshold. The service request server can then determine potential component failures that triggered the service requests by searching a database containing operational event logs of the computing system. Upon determination, the service request server can then notify another group of users affected by the component failures but may not have submitted service requests or even recognize the service issues. Optionally, the service request server can also provide at least one of a workaround of the identified component failure or an estimated resolution time for the identified component failure.

As such, the service request server can provide prompt notifications to all users impacted by the identified component failures. Thus, user experiences as well as user perceptions of the cloud services can be improved. In addition, the prompt notifications can also reduce a number of additional service requests submitted to the cloud service providers because the additional users understand that the cloud service providers are aware of the service issues. As such, costs for provisioning support teams to address service requests may be reduced.

BRIEF DESCRIPTION OF THE DRAWINGS

FIG. 4 is a computing device suitable for certain components of the computing system in FIG. 1.

DETAILED DESCRIPTION

Figure 1:
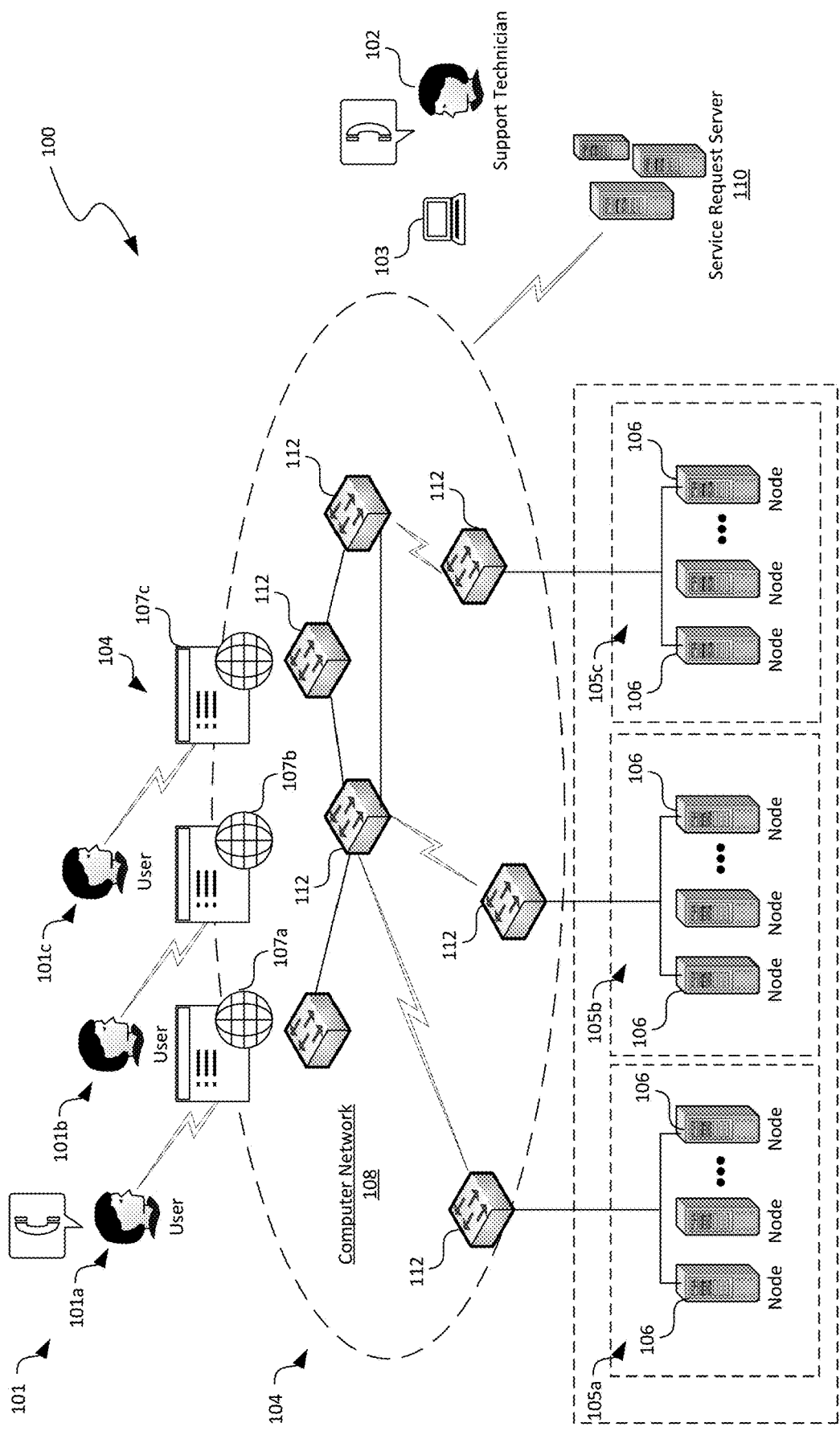
FIG. 1 is a schematic diagram of a cloud computing system in accordance with embodiments of the disclosed technology.

Certain embodiments of computing systems, devices, components, modules, routines, and processes for managing service requests in cloud computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-4.

As used herein, the term "computing cluster" generally refers to a computer system having a plurality of network devices that interconnect a plurality of servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a computing fabric. The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. For example, a node can include a computing server having a hypervisor configured to support one or more virtual machines.

Also used herein, the term "service request" generally refers to a request from a user of a cloud service reporting one or more service issues related to the cloud service. A support team of a cloud service provider can receive a service request via various channels. For example, a user can submit a service request by calling a member of the support team, submitting the service request via an electronic portal (e.g., a website of the cloud service), transmitting the service request via emails, text messages, online chats, or other suitable messaging services. A service request can also be related to and contain information of one or more service components of the provided cloud service.

Further used herein, the term "service component" generally refers to an independent component of a cloud service configured to perform one or more target functions. For example, service components of a cloud-based video sharing service can include cloud storage, video portal, video editing, comment processing, or other suitable types of service components. The term "component failure" as used herein generally refers to a condition under which a service component is unreachable or fails to function at an expected performance level. A component failure can be declared as a service issue when the component failure affects more than one user of a related service component.

Certain cloud-based computing systems can have long delays between acknowledging a service issue and receiving service requests related to the service issue. The long delays can also negatively affect perception of service quality of the cloud services. Several embodiments of the disclosed technology can shorten such delays by automatically consolidating received service requests and determining whether the service requests have an abnormal profile. In response to determining the received service requests have an abnormal profile, the service request server can then identify potential component failures that triggered the service requests by, for example, searching a database containing operational event logs. The service request server can then notify additional users impacted by the component failures even before the users recognize the occurrence of the related service issues, as described in more detail below with reference to FIGS. 1-4.

FIG. 1 is a schematic diagram illustrating a cloud-based computing system 100 having service request management configured in accordance with embodiments of the disclosed technology. As shown in FIG. 1, the computing system 100 can include a computer network 108 interconnecting a plurality of users 101, a computing fabric 104, and a service request server 110. Even though particular components of the computing system 100 are shown in FIG. 1, in other embodiments, the computing system 100 can also include additional and/or different constituents. For example, the computing system 100 can also include additional computing fabrics (not shown) interconnected with one another. In other examples, the computing system 100 can also include network storage devices, utility infrastructures, and/or other suitable components.

As shown in FIG. 1, the computer network 108 can include one or more network devices 112 that interconnect the users 101, the computing fabric 104, and the service request server 110. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies. The computing fabric 104 can include a plurality of nodes 106 arranged into computing clusters 105 (shown individually as first, second, and third computing clusters 105a-105c, respectively). Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

The service request server 110 can be configured to manage service requests receive from the users 101 and provide prompt notification of service issues to other impacted users 101. In the illustrated embodiment, the service request server 110 can include one or more servers operatively coupled to the computer network 108. In other embodiments, the service request server 110 can be one or more nodes 106 in the computing fabric 104. In further embodiments, the service request server 110 can also include one or more services provided by one or more nodes 106 of the computing fabric 104 or other suitable computing systems (not shown).

In certain embodiments, the service request server 110 can be configured to detect and consolidate received service requests from the users 101. The service request server 110 can then be configured to identify profile abnormalities in the received service requests. When profile abnormalities are identified, the service request server 110 can then be configured to determine one or more potential component failures that triggered the service requests. The service request server 110 can then be configured to notify additional users 101 who are impacted by the determined component failures but may not have recognize existence of associated service issues. Optionally, the service request server 110 can also provide at least one of a workaround of the identified component failure or an estimated resolution time for the identified component failure. In other embodiments, the service request server 110 can also cause application of certain remedial actions for the identified component failures. Certain example components of the service request server 110 are described in more detail below with reference to FIGS. 2-4.

In operation, the users 101 can utilize various cloud services provided by the nodes 106 of the computing fabric 104 for computing, communications, network storage, or performing other suitable functions. The computing fabric 104 can provide user portals 107 (identified individually as first, second, and third user portals 107a-107c, respectively) to facilitate access and/or management of the various cloud services. The user portals 107 can include one or more webpages that show, for instance, usage, operational, or other suitable types of status of the provided cloud services.

In the event of interruptions in the provided cloud services, the service request server 110 can facilitate management of service requests received from the users 101. For example, as shown in FIG. 1, the first user 101a and the second users 101b can both experience interruptions or service issues in a provided cloud service. In response, the first user 101a can submit a service request 120 (shown in FIG. 2) to a support technician 102 via telephone. Upon receiving the submitted service request, the support technician 102 can input details of the service request 120 to the service request server 110 using, for instance, a computer 103. The second user 101b can also submit a service request 120 but via the second user portal 107b to the service request server 110. In response, the service request server 110 can automatically log the received service request 120 as service request records into, for example, a database. In other examples, both the first and second users 101a and 101b can submit the service requests via telephone or via the first and second user portals 107a and 107b, respectively.

Upon detecting the submitted service requests 120, the service request server 110 can aggregate the service requests 120 and determine whether a profile of the service requests 120 is abnormal. For example, the service request server 110 can determine a moving average of a number of the received service requests 120 in an hour and compare the moving average to a predetermined threshold. In one embodiment, the predetermined threshold can be provided by an administrator of a cloud service provider. In another embodiment, the predetermined threshold can be determined based on historical values. For instance, the threshold can be based on a weekly, monthly, quarterly, or yearly moving average of the number of service requests 120 for the computing fabric 104 or the individual computing clusters 105.

In response to determining that the profile of the received service requests has abnormality, the service request server 110 can then identify one or more component failures in the computing fabric 104 based on the received service requests 120. In one embodiment, the service request server 110 can search a database containing event logs of the computing fabric 104 or a computing cluster 105 thereof based on one or more keywords from the service requests 120. In other embodiments, the service request server 110 can identify the component failure by correlating a timing, sequence, or other characteristics of the component failures in the event logs and the received service requests 120. In further embodiments, the service request server 110 can identify the component failures based on user input or other suitable techniques.

Once identified the component failures, the service request server 110 can also determine one or more other users 101 who are also impacted by the identified component failures. The impacted users 101 may not have recognized the existence of the service issues related to the identified component failures. In the example illustrated in FIG. 1, the third user 101c can be impacted by the identified component failures but may have not recognized the service issues. The service request server 110 can then notify the third user 101c of the identified component failures and/or associated service issues before the third user 101c.

The service request server 110 can notify the third user 101c via various channels. For example, the service request server 110 can post a message in the third user portal 107c. The service request server 110 can also optionally post on the third user portal 107c at least one of a workaround of the identified component failure or an estimated resolution time for the identified component failures. In other examples, the service request server 110 can transmit an email, a text message, or other suitable types of message to the third user 101c.

In certain embodiments, the service request server 110 can also cause remedial actions to be performed in the computing fabric 104 based on the identified component failures. For example, the service request server 110 can cause a reboot on one or more nodes 106 hosting the service components with the identified component failures. The service request service request server 110 can also because one or more service components be migrated from one node 106 to another node 106 within the same computing cluster 105 or to a node 106 in a different computing cluster 105.

Figure 2:
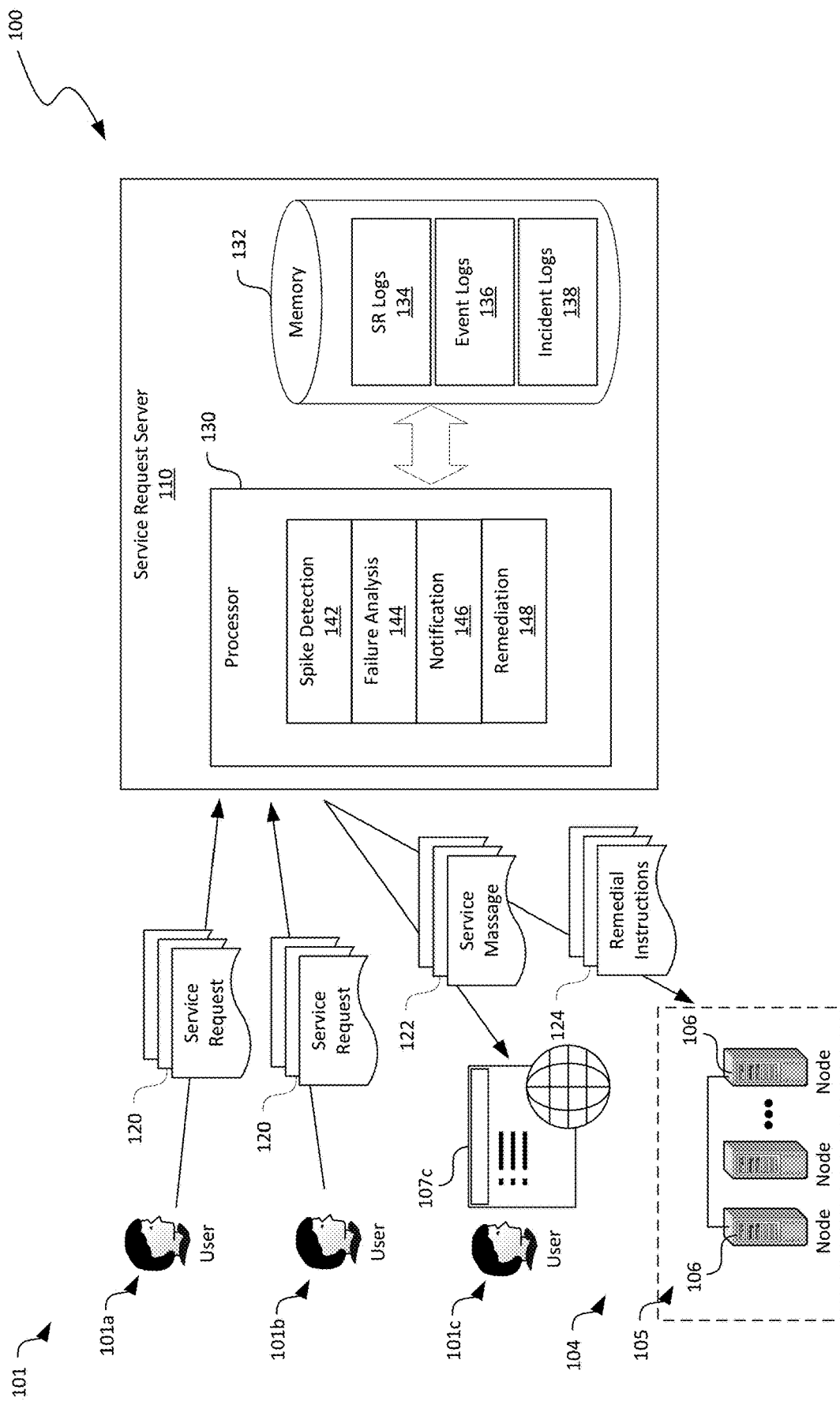
FIG. 2 is a schematic diagram illustrating certain hardware/software components of the service request server in FIG. 1.

FIG. 2 is a schematic diagram illustrating certain hardware/software components of the service request server 110 of the computing system 100 in FIG. 1. In FIG. 2, certain components of the computing system 100 are omitted for clarity. For example, only one computing cluster 105 is shown in FIG. 2 for illustration purposes. In addition, in FIG. 2 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the service request server 110 can include a processor 130 operatively coupled to a memory 132. The processor 130 can include a microprocessor, a field-programmable gate array, and/or other suitable logic devices. The memory 132 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 130 (e.g., instructions for performing the methods discussed below with reference to FIGS. 5A-5C). Though not shown in FIG. 2, the service request server 110 can also include a display, a touch screen, a keyboard, a mouse, a printer, and/or other suitable types of input/output components configured to accept input from and provide output to, for instance, the support technician 102 in FIG. 1 and/or an automated software controller (not shown).

The memory 132 of the service request server 110 can contain instructions executable by the processor 130 to cause the processor 130 to provide various software components. For example, as shown in FIG. 2, the processor 130 can provide a spike detection component 142, a component failure component 144, a notification component 146, and an optional remediation component 148. In other embodiments, the processor 130 can also provide an input component, a display component, or other suitable types of component.

In the illustrated embodiment, the spike detection component 142 can be configured to detect profile abnormalities in received service requests 120 from the first and second users 101a and 101b. In certain implementations, the spike detection component 142 can also be configured to store the detected service requests as records of service request logs (shown in FIG. 2 as "SR logs 134") in a database contained in the memory 132. In other implementations, the service request server 110 can also include a database component (not shown) or other suitable components to store, retrieve, or otherwise manage the SR logs 134.

The spike detection component 142 can be configured to analyze the detected service requests 120 to determine a profile of the received service requests 120. The profile can include one or more profile parameters. One example profile parameter can include a moving average of a number of received service requests 120 per hour, per two hours, or based on other suitable intervals. Another example profile parameter can include an average interval between two successive service requests 120 over a period of one hour, two hours, a week, or other suitable intervals. In certain embodiments, the profile parameters can be determined for the computing fabric 104. In other embodiments, the profile parameters can be determined for each computing cluster 105 in the computing fabric 104. In further embodiments, the profile parameters can also be determined for each datacenter, each datacenter group, or other suitable physical or logical divisions.

The spike detection component 142 can then compare the determined one or more profile parameters to corresponding thresholds. In certain embodiments, administrators of a cloud service provider can set the thresholds. In other embodiments, the thresholds can be set based on historical values. For example, a threshold for the moving average of the number of received service requests 120 can be set at 50%, 75%, or other suitable percentages of a monthly moving average of the number of received service requests 120. In another example, a threshold for the average interval between two successive service requests 120 can be set to an average interval between two successive service requests 120 over a period of a week.

Based on the comparison, the spike detection component 142 can indicate whether a profile abnormality exists in the received service requests 120. For example, the spike detection component 142 can indicate an abnormality when the moving average of the number of received service requests 120 exceeds a threshold, when the average interval between two successive service requests 120 is lower than a threshold, or based on other suitable criteria. The spike detection component 142 can then transmit the indication of abnormality to the failure analysis component 144 for further processing.

The failure analysis component 144 can be configured to identify one or more component failures of service component based on the received service requests 120 in response to the indicated abnormality by the spike detection component 142. In certain embodiments, the failure analysis component 144 can be configured to determine one or more keywords from the received service requests 120 and searching a database containing event logs 136 based on the keywords. Example keywords can include "portal unavailable," "webpage unavailable," "network storage inaccessible," etc.

The event logs 136 can include multiple entries of operational events such as server failure, network congestion, server communication lost, power failure in the node 106, computing cluster 105, or computing fabric 104 and associated time stamps. In certain embodiments, the event logs 136 can also include metadata or other associated data identifying one or more symptoms, consequences, potential causes, or other information associated with a particular entry of the operational event. For example, the metadata can identify that a symptom of a network failure of a particular network device 112 (FIG. 1) is to cause a portal to be unavailable; a webpage to be unavailable; a network storage to be inaccessible, or other service interruptions. In other embodiments, the event logs 136 can also include failure messages, failure codes, or other suitable information.

In certain embodiments, the failure analysis component 144 can identify component failures by identifying entries in the event log 136 that contain the keywords from the service requests 120. In other embodiments, searching the event logs 136 can also include identifying entries in the event logs 136 that have metadata or other associated data that contain the keywords from the service requests 120. In further embodiments, searching the event logs 136 can also include searching the entries based on a timing, sequence, or other characteristics of the received service requests 120. The failure analysis component 144 can then identify component failures based on the identified entries in the event logs 136, user input, or other suitable information. Once identified, the failure analysis component 144 can transmit the component failures to the notification component 146 for further processing.

The notification component 146 can be configured to notify one or more users 101 (e.g., the third user 101c) who are impacted by the component failures but may not have recognized or experienced associated service interruptions. In certain embodiments, the notification component 146 can cause a service message 122 be posted on the third user portal 107c alerting the third user 101c of the identified component failures and/or associated service interruptions. The posted service message 122 can also include at least one of a workaround of the identified component failure, an estimated resolution time for the identified component failure, or other suitable information. In other embodiments, the notification component 146 can also transmit an email, a text message, or other suitable types of message to the third user 101c.

As shown in FIG. 2, in certain embodiments, the optional remediation component 148 can also be configured to transmit remedial instructions 124 to the computing fabric 104. In certain embodiments, the remediation component 148 can identify to the computing fabric 104 that a node 106, a computing cluster 105, or other components in the computing fabric 104 requires a reboot. In other embodiments, the remediation component 148 can also identify one or more service components to be migrated from an original node 106 to another node 106 in the same or different computing cluster 105. In further embodiments, the remediation component 148 can cause the computing fabric 104 to perform other suitable remediation or corrective operations. In yet further embodiments, the remediation component 148 can be omitted.

Figure 3A:
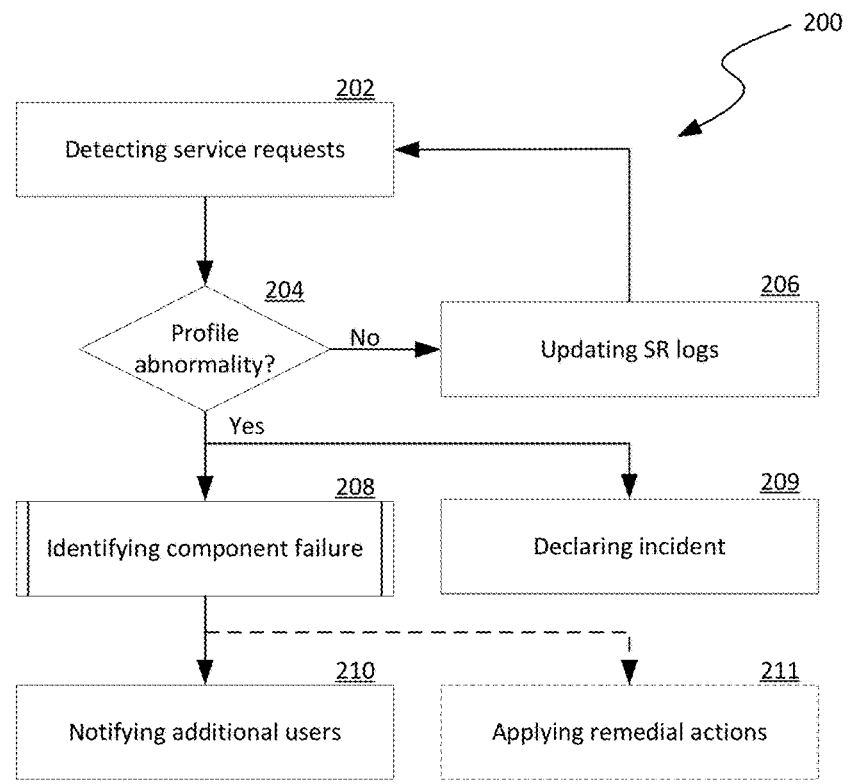
FIGS. 3A-3C are flowcharts illustrating various aspects of processes of managing service requests in a cloud computing system in accordance with embodiments of the disclosed technology.

FIG. 3A is a flowchart illustrating a process 200 of managing service requests in a cloud computing system in accordance with embodiments of the disclosed technology. Even though the process 200 is described in relation to the computing system 100 of FIG. 1, in other embodiments, the process 200 can also be implemented in other suitable computing systems with similar or different components and/or configurations.

As shown in FIG. 3A, the process 200 includes detecting service requests from users of cloud services at stage 202. In certain embodiments, detecting service requests includes receiving records of new service requests entered by, for example, the support technician 102 in FIG. 1. In other embodiments, detecting service requests can also include detecting a submitted service requests via the user portals 107 (FIG. 1). In further embodiments, detecting service requests can also include creating records of new service requests based on emails, text messages, or other suitable types of messages from the users 101.

As shown in FIG. 3A, the process 200 can then include a decision stage 204 to determine whether the detected service requests have a profile abnormality. The profile abnormality can be based on various profile parameters of the detected service requests. Example profile parameters are discussed above with reference to FIG. 2. In certain embodiments, in response to one profile parameter deviates from a threshold, a profile abnormality can be declared. In other embodiments, a combination of the profile parameters can be used in logical AND, OR, or a combination thereof in order to declare a profile abnormality exists. In further embodiments, user input can also be used to determine whether the detected service requests have a profile abnormality. Example embodiments of such determination are described in more detail below with reference to FIG. 3B.

In response to determining that the detected service requests do not have a profile abnormality, the process 200 proceeds to updating service request logs at stage 206 before reverting to detecting service requests at stage 202. In response to determining that the detected service requests have a profile abnormality, the process 200 proceeds to identifying one or more component failures based on the detected service request at stage 208. In certain embodiments, identifying the component failures can include searching a database containing event logs of the computing fabric 104 (FIG. 1). As describe in more detail below with reference to FIG. 3C, searching the database can also be performed on a per computing cluster 105 (FIG. 1) basis to determine whether additional computing clusters 105 have similar component failures.

The process 200 can also include declaring a service issue at stage 209 if one has not been declared before. In certain embodiments, declaring a service issue can include alerting a support team of the identified component failures and/or the service requests. In other embodiments, declaring a service issue can also include adjusting operations of the computing fabric by, for example, declining additional workload from the users 101, migrating current workload to other computing clusters or computing fabrics, or performing other suitable operations.

The process 200 can then include notifying additional users of the identified component failure and/or associated service interruption at stage 210. Various example notification channels can be used as described above with reference to FIG. 2. Optionally, the process 200 can also include applying remedial actions at stage 211. Examples of remedial actions are also described above with reference to FIG. 2.

Figure 3B:
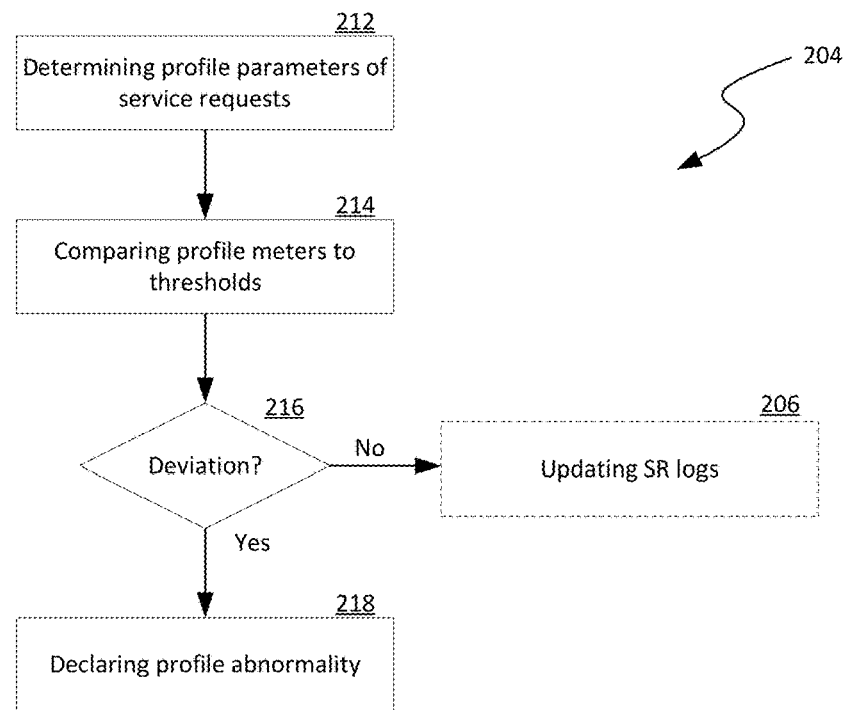

FIG. 3B is a flowchart illustrating example operations of determining whether the detected service requests have a profile abnormality in accordance with embodiments of the disclosed technology. As shown in FIG. 3B, the operations include determining a profile of the detected service requests at stage 212. The profile can include various profile parameters, examples of which are described above with reference to FIG. 2. The operations can also include comparing the determined profile parameters to corresponding thresholds.

The operations can then include a decision stage 216 to determine whether the profile parameters substantially deviate from the thresholds (e.g., within 10% or 20% of the thresholds). In response to determining that the profile parameters do not substantially deviate from the thresholds, the operations revert to updating the service request logs at stage 206 in FIG. 3A. In response to determining that the profile parameters do substantially deviate from the thresholds, the operations proceed to declaring a profile abnormality at stage 218.

Figure 3C:
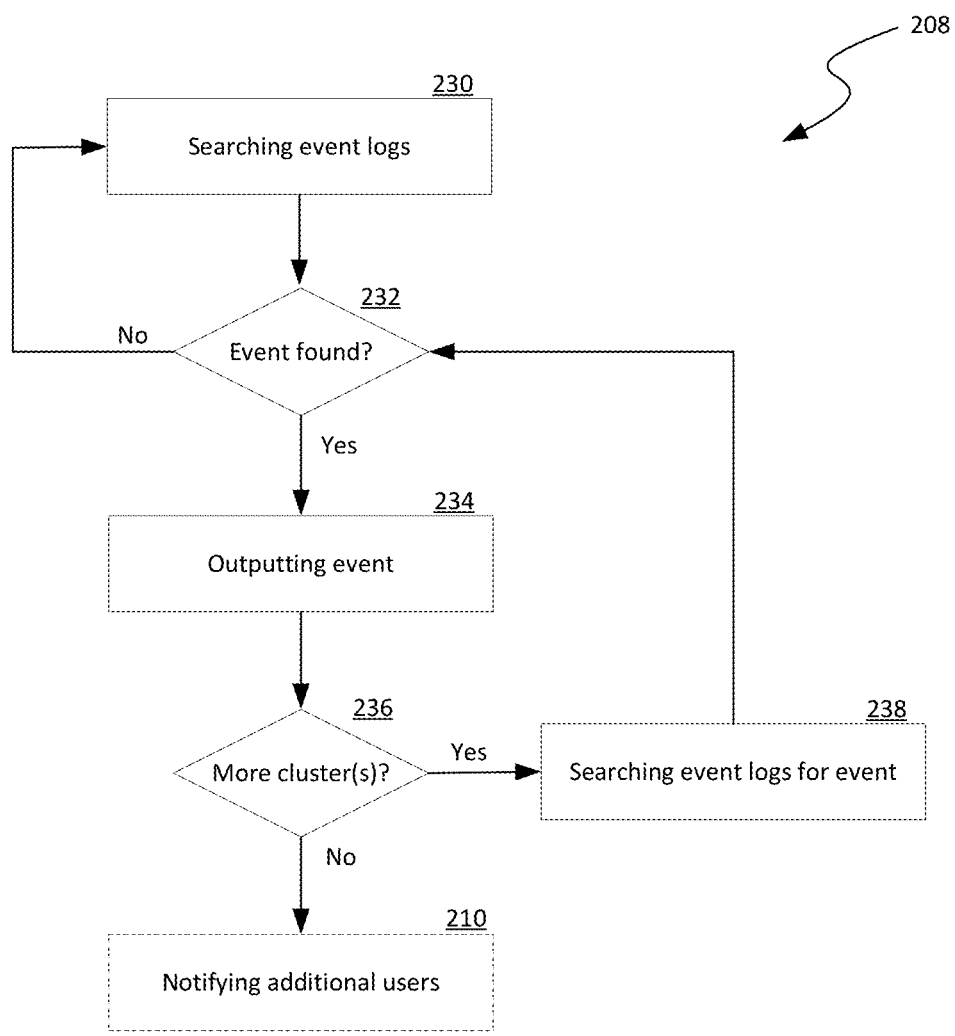

FIG. 3C is a flowchart illustrating example operations of identifying one or more component failures in accordance with the disclosed technology. As shown in FIG. 3C, the operations include searching event logs based on the service requests at stage 230. As described above with reference to FIG. 2, searching the event logs can include searching entries of the event logs as well as metadata associated with the entries based on one or more keywords in the detected service requests. The operations can then include a decision stage 232 to determine whether an entry is found. In response to determining that an entry is not found, the operations can revert to searching the event logs again at stage 230, alerting an administrator of the cloud service provider, or performing other suitable actions.

In response to determining that an entry is found, the operations can include outputting the event at stage 234. The operations can then include another decision stage 236 to determine whether additional computing clusters exist in the computing fabric. In response to determining that additional computing clusters exist, the operations can include searching the event logs to determine whether the additional computing clusters have reported similar or the same operational event. The operations can the revert to stage 232 to determine whether similar or the same operational event is found in the additional computing clusters. The operations can continue until no more computing clusters is to be searched. Then operations can then proceed to notifying additional users of the identified event at stage 210 in FIG. 3A.

FIG. 4 is a computing device 300 suitable for certain components of the computing system 100 in FIG. 1. For example, the computing device 300 can be suitable for the nodes 106 or the service request server 110 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of managing service requests in a cloud computing system having multiple servers, the method comprising:

executing instructions at the multiple servers to provide cloud computing services to multiple users;

detecting, at one of the servers, service requests reporting service issues of at least one of the provided cloud computing services from at least one of the users of the cloud computing system; and in response to the detected service requests, at the one of the servers, determining whether a profile of the detected service requests of the at least one of the provided cloud computing services substantially deviates from a predetermined profile; and in response to determining that the profile of the detected service requests substantially deviates from the predetermined profile, identifying a component failure of a service component at one or more of the servers in the cloud computing system triggering the detected service requests by searching a database containing electronic records of operational event logs of the cloud computing system based on the reported service issues in the detected service requests;

determining, based on the identified component failure, a subset of the multiple users who are also impacted by the identified component failure but have not yet submitted service requests for the service issues regarding the identified component failure of the service component;

posting, on a user portal of the individual subset of users of the cloud computing system, an electronic message representing a notification regarding the identified component failure of the service component; and causing a reboot on one or more servers hosting the service component with the identified component failure.

2. The method of claim 1 wherein determining whether the profile of the detected service requests substantially deviates from the predetermined profile includes determining whether an hourly average of the detected service requests exceeds a predetermined threshold.

3. The method of claim 1 wherein determining whether the profile of the detected service requests substantially deviates from the predetermined profile includes determining whether an hourly average of the detected service requests exceeds 50% of a daily, weekly, or monthly average of the detected service requests.

4. The method of claim 1 wherein identifying the component failure includes:

identifying one or more keywords from the detected service requests; and
searching the database having operational event logs of the cloud computing system based on the identified one or more keywords.

5. The method of claim 1 wherein:
the cloud computing system includes a first computing cluster and a second computing cluster;
the detected service requests are reporting service issues from users of the first computing cluster; and
the method further includes:
  determining whether the second computing cluster has the same component failure by searching another database having operational event logs of the second computing cluster; and
  informing other users of the second computing cluster regarding the component failure in response to determining that the second computing cluster has the same component failure.

6. The method of claim 1 wherein:
the cloud computing system includes a first computing cluster and a second computing cluster;
the detected service requests report service issues from users of the first computing cluster;
posting, on the user portal of the cloud computing system, the notification of the identified component failure includes posting, on a first user portal of the first computing cluster, a first notification of the identified component failure of the service component; and
the method further includes:
  determining whether the second computing cluster has the same component failure by searching another database having operational event logs of the second computing cluster; and
  posting, on a second user portal of the second computing cluster, a second notification of the identified component failure of the service component in response to determining that the second computing cluster has the same component failure.

7. The method of claim 1, further comprising posting, on the user portal of the cloud computing system, at least one of a workaround of the identified component failure or an estimated resolution time for the identified component failure.

8. The method of claim 1, further comprising causing migration of the service component with the identified component failure from a first server to a second server of the cloud computing system in response to determining that the profile of the detected service requests substantially deviates from the predetermined profile.

9. The method of claim 1 wherein:
the identified component failure is a first component failure of a first service component; and
the method further includes:
  identifying a second component failure of a second service component in the cloud computing system by searching the database having operational event logs of the cloud computing system based on the detected service requests;
  identifying a potential common cause of the first and second component failures based on a timing, sequence, or symptom of the first and second component failure; and
  posting, on the user portal of the cloud computing system, another notification regarding the potential common cause of the first and second component failures.

10. A computing system, comprising:
a processor; and
a memory containing instructions executable by the processor to cause the computing system to provide cloud computing services to multiple users and to perform a process comprising:
  detecting service requests reporting service issues from the users of one of the cloud computing services;
  determining whether a profile of the detected service requests of the one of the cloud computing services substantially deviates from a predetermined profile; and
  in response to determining that the profile of the detected service requests substantially deviates from the predetermined profile,
    performing a search of a database containing operational event logs of the computing system based on the detected service requests;
    identifying a component failure of a service component triggering the detected service requests in the computing system based on the search;
    determining, based on the identified component failure, a subset of the multiple users who are also impacted by the identified component failure but have not yet submitted service requests for the service issues regarding the identified component failure of the service component;
    automatically generating and transmitting an electronic message to the subset of the multiple users impacted by the identified component failure; and
    causing migration of the service component with the identified component failure from a first server to a second server of the cloud computing system in response to determining that the profile of the detected service requests substantially deviates from the predetermined profile.

11. The computing system of claim 10 wherein performing the search of the database includes:
identifying one or more keywords from the detected service requests; and
performing a search of the database containing operational event logs of the cloud computing system based on the identified one or more keywords.

12. The computing system of claim 10 wherein:
the cloud computing system includes a first computing cluster and a second computing cluster;
the detected service requests report service issues from users of the first computing cluster; and
the process performed by the processor further includes:
  determining whether the second computing cluster has the same component failure by searching another database having operational event logs of the second computing cluster; and
  informing other users accessing the second computing cluster regarding the component failure in response to determining that the second computing cluster has the same component failure.

13. The computing system of claim 10 wherein:
the cloud computing system includes a first computing cluster and a second computing cluster;
the detected service requests report service issues from users of the first computing cluster;
informing additional users includes notifying a first group of additional users accessing the first computing cluster regarding the identified component failure of the service component in the first computing cluster; and
the process performed by the processor further includes:

determining whether the second computing cluster has the same component failure by searching the database having operational event logs of the second computing cluster; and notifying a second group of additional users accessing the second computing cluster regarding the identified component failure of the service component in the second computing cluster.

14. The computing system of claim 10 wherein the process performed by the processor further includes posting, on a user portal of the cloud computing system, at least one of a workaround of the identified component failure or an estimated resolution time for the identified component failure.

15. The computing system of claim 10 wherein the process performed by the processor further includes causing a reboot on one or more servers hosting the service component with the identified component failure or causing migration of the service component with the identified component failure from a first server to a second server of the cloud computing system.

16. A method of managing service requests in a cloud computing system having a first computing cluster and a second computing cluster individually having multiple servers, the method comprising:

executing instructions at the multiple servers of the first and second computing clusters to provide cloud computing services to multiple users;

detecting, at one of the servers, service requests reporting service issues of one of the cloud computing services from the users of the first computing cluster; and in response to the detected service requests, performing a first search of a first database containing operational event logs of the first computing cluster based on the detected service requests to identify a component failure of a service component triggering the detected service requests in the first computing cluster;

performing a second search of a second database containing operational event logs of the second computing cluster to determine whether the identified component failure of the service component in the first computing cluster also exists in the second computing cluster; and in response to determining that the identified component failure also exists in the second computing cluster, determining, based on the identified component failure, a subset of the multiple users who are also impacted by the identified component failure in the second computing cluster but have not yet submitted service requests for the service issues regarding the identified component failure of the service component;

automatically generating and transmitting electronic messages to the individual subset of the multiple users who are also impacted by the identified component failure in the second computing cluster for notifying the identified component failure in the second computing cluster; and causing migration of the service component with the identified component failure from a first server to a second server of the cloud computing system in response to determining that the profile of the detected service requests substantially deviates from the predetermined profile.

17. The method of claim 16, further comprising:

determining whether a profile of the detected service requests substantially deviates from a predetermined profile of the first computing cluster; and in response to determining that the profile of the detected service requests substantially deviates from the predetermined profile of the first computing cluster, performing the first search of the first database containing operational event logs of the first computing cluster based on the detected service requests to identify the component failure of the service component in the first computing cluster.

18. The method of claim 16 wherein performing the first search includes:

identifying one or more keywords from the detected service requests; and searching the first database based on the identified one or more keywords.

19. The method of claim 16, further comprising providing at least one of a workaround of the identified component failure or an estimated resolution time for the identified component failure when notifying the additional users of the second computing cluster regarding the identified component failure in the second computing cluster.

* * * * *